United States Patent
Goodrich et al.

(10) Patent No.: US 12,210,567 B2
(45) Date of Patent: Jan. 28, 2025

(54) METHODS, SYSTEMS, AND MEDIA FOR DETERMINING PLAYLIST TITLE COHERENCE AND QUALITY

(71) Applicant: Google LLC, Mountain View, CA (US)

(72) Inventors: Ben Goodrich, San Francisco, CA (US); Kumar Chippala, Mountain View, CA (US)

(73) Assignee: Google LLC, Mountain View, CA (US)

( * ) Notice: Subject to any disclaimer, the term of this patent is extended or adjusted under 35 U.S.C. 154(b) by 155 days.

(21) Appl. No.: 18/071,986

(22) Filed: Nov. 30, 2022

(65) Prior Publication Data
US 2024/0176816 A1    May 30, 2024

(51) Int. Cl.
| | | |
|---|---|---|
| G06F 16/63 | (2019.01) | |
| G06F 16/638 | (2019.01) | |
| G06F 40/263 | (2020.01) | |
| G06N 20/00 | (2019.01) | |

(52) U.S. Cl.
CPC .......... *G06F 16/639* (2019.01); *G06F 40/263* (2020.01); *G06N 20/00* (2019.01)

(58) Field of Classification Search
CPC ...... G06F 16/639; G06F 40/263; G06N 20/00
See application file for complete search history.

(56) References Cited

U.S. PATENT DOCUMENTS

| | | | |
|---|---|---|---|
| 8,914,384 B2 | 12/2014 | Gates et al. | |
| 9,524,487 B1 | 12/2016 | Yagnik et al. | |
| 9,563,703 B2 | 2/2017 | Nijim et al. | |
| 9,589,237 B1 | 3/2017 | Qamar | |
| 10,936,653 B2 | 3/2021 | Levy et al. | |
| 2020/0278997 A1* | 9/2020 | Lamere | G06F 16/632 |
| 2020/0364299 A1* | 11/2020 | Niu | G06N 3/088 |
| 2021/0374361 A1* | 12/2021 | Wick | G06F 40/58 |
| 2022/0245362 A1* | 8/2022 | Nizar | G06F 40/216 |
| 2023/0367968 A1* | 11/2023 | Eisenstadt | G06N 3/045 |
| 2024/0028740 A1* | 1/2024 | Chan | G06F 21/577 |

(Continued)

OTHER PUBLICATIONS

Lim, Jong Yoon, et al. "Subsentence extraction from text using coverage-based deep learning language models." Sensors 21.8 (2021): 2712. (Year: 2021).*

(Continued)

*Primary Examiner* — Mohsen Almani
(74) *Attorney, Agent, or Firm* — Shumaker & Sieffert, P.A.

(57) ABSTRACT

Methods, systems, and media for determining playlist title coherence and quality are provided. In some embodiments, a method for generating playlist recommendations includes: determining, using a hardware processor, a title of a playlist; generating, using the hardware processor, a byte-level representation of the title based on the title of the playlist; determining, using the hardware processor, an embedded representation of the title based on the byte-level representation; determining, using the hardware processor, a perplexity score of the title by inputting the embedded representation of the title into a trained language model, wherein the perplexity score is an output of the trained language model; and causing, using the hardware processor, a recommendation based on the perplexity score of the title to be presented.

18 Claims, 5 Drawing Sheets

(56) References Cited

U.S. PATENT DOCUMENTS

2024/0126924 A1* 4/2024 Pabolu .................. G06F 40/40

OTHER PUBLICATIONS

Lau, "Cross-Entropy, Negative Log-Likelihood, and All That Jazz", published in Toward Data Science, Mar. 8, 2022 (Year: 2022).*

Lei, Lei. "Intelligent Recognition English Translation Model Based on Embedded Machine Learning and Improved GLR Algorithm." Mobile Information Systems 2022 (Year: 2022).*

Ruder, Sebastian, Ivan Vulić, and Anders Søgaard. "A survey of cross-lingual word embedding models." Journal of Artificial Intelligence Research 65 (2019) (Year: 2019).*

Backfried et al., "Method of expanding a vocabulary of a speech system", EP 1074 973 A2, Feb. 7, 2001 (Year: 2001).*

Prabhakaran Sethuraman, WO 2023140904 A1, PCT/US2022/048116, Jan. 21, 2022 (Year: 2022).*

Baisa, Vit. Byte level language models. Diss. Ph. D. thesis, Masaryk University, 2016. (Year: 2016).*

Gerz, Daniela, et al. "Language modeling for morphologically rich languages: Character-aware modeling for word-level prediction." Transactions of the Association for Computational Linguistics 6 (2018): 451-465. (Year: 2018).*

Le Godais, Gaël, Tal Linzen, and Emmanuel Dupoux. "Comparing character-level neural language models using a lexical decision task." Proceedings of the 15th Conference of the European Chapter of the Association for Computational Linguistics: vol. 2, Short Papers. 2017. (Year: 2017).*

Kim, Yoon, et al. "Character-aware neural language models." Proceedings of the AAAI conference on artificial intelligence. vol. 30. No. 1. 2016. (Year: 2016).*

Alvear, D., "Friendshipify: A Playlist Generator for Friends", last updated May 27, 2020, pp. 1-14, available at: https://towardsdatascience.com/friendshipify-a-playlist-generator-for-friends-f79297f08b03.

* cited by examiner

300

310 — Cool Britannia: '90s Britpop

315 — An assortment of the finest UK indie anthems from the mid-'90s.

320 — 酷不列颠尼亚:90 年代英伦摇滚

325 — 90 年代中期最精彩的英国独立音乐金曲大荟萃。

330 — "Cool Britannia": Britpop de los 90

335 — Escucha un mix de los mejores himnos indie del Reino Unido de mediados de la década de 1990.

FIG. 3

METHODS, SYSTEMS, AND MEDIA FOR DETERMINING PLAYLIST TITLE COHERENCE AND QUALITY

TECHNICAL FIELD

The disclosed subject matter relates to determining playlist title coherence and quality. More particularly, the disclosed subject matter relates to learning techniques that determine whether a playlist title is coherent and of a particular quality to recommend a playlist corresponding to the playlist title to other users.

BACKGROUND

Many content streaming services allow users to save and/or aggregate content provided by the streaming service to a playlist within the service, where these user-generated playlists can be shared or otherwise publicized to the users of the content streaming service. In some instances, the streaming service can recommend a user-generated playlist to other users of the streaming service using a recommendation system. It can be difficult, however, for these recommendation systems to determine whether a playlist should be recommended. For example, evaluating quality across many languages can be challenging for such recommendation systems.

Accordingly, it is desirable to provide new mechanisms for determining playlist title coherence and quality.

SUMMARY

Methods, systems, and media for determining playlist title coherence and quality are provided.

In accordance with some embodiments of the disclosed subject matter, a method for generating playlist recommendations is provided, the method comprising: determining, using a hardware processor, a title of a playlist; generating, using the hardware processor, a byte-level representation of the title based on the title of the playlist; determining, using the hardware processor, an embedded representation of the title based on the byte-level representation; determining, using the hardware processor, a perplexity score of the title by inputting the embedded representation of the title into a trained language model, wherein the perplexity score is an output of the trained language model; and causing, using the hardware processor, a recommendation based on the perplexity score of the title to be presented.

In some embodiments, the trained language model is trained using a plurality of training data that includes at least one of a plurality of playlist titles and a plurality of playlist descriptions.

In some embodiments, the trained language model is trained using a plurality of training data that includes a plurality of selected playlist titles and the trained language model is configured to generate the perplexity score of the title of the playlist based on a negative log-likelihood that a sequence of characters in the title of the playlist would appear in one of the plurality of selected playlist titles in the plurality of training data.

In some embodiments, the perplexity score is an overall perplexity score that is determined by calculating a plurality of perplexity scores that each correspond to an individual perplexity score of a portion of the embedded representation, wherein the overall perplexity score is a combination of the plurality of perplexity scores.

In some embodiments, the method further comprises: determining that the perplexity score indicates that the byte-level representation of the title is a likely sequence of bytes; and generating a notification for a playlist recommendation system to recommend the playlist in response to determining that the perplexity score indicates that the byte-level representation of the title is a likely sequence of bytes.

In some embodiments, the method further comprises: determining that the perplexity score indicates that the byte-level representation of the title is an unlikely sequence of bytes; and generating a notification for a playlist recommendation system to recommend the playlist in response to determining that the perplexity score is above a threshold value.

In some embodiments, the method further comprises determining that the title is based in a language from a plurality of languages.

In some embodiments, the playlist comprises a plurality of music tracks.

In accordance with some embodiments of the disclosed subject matter, a system for generating playlist recommendations is provided, the system comprising a hardware processor that is configured to: determine a title of a playlist; generate a byte-level representation of the title based on the title of the playlist; determine an embedded representation of the title based on the byte-level representation; determine a perplexity score by inputting the embedded representation of the title into a trained language model, wherein the perplexity score is an output of the trained language model; and cause a recommendation based on the perplexity score of the title to be presented.

In accordance with some embodiments of the disclosed subject matter, a non-transitory computer-readable medium containing computer executable instructions that, when executed by a processor, cause the processor to execute a method for generating playlist recommendations is provided, the method comprising: determining a title of a playlist; generating a byte-level representation of the title based on the title of the playlist; determining an embedded representation of the title based on the byte-level representation; determining a perplexity score by inputting the embedded representation of the title into a trained language model, wherein the perplexity score is an output of the trained language model; and causing a recommendation based on the perplexity score of the title to be presented.

In accordance with some embodiments of the disclosed subject matter, a system for generating playlist recommendations is provided, the system comprising: means for determining a title of a playlist; means for generating a byte-level representation of the title based on the title of the playlist; means for determining an embedded representation of the title based on the byte-level representation; means for determining a perplexity score by inputting the embedded representation of the title into a trained language model, wherein the perplexity score is an output of the trained language model; and means for causing a recommendation based on the perplexity score of the title to be presented.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 3 shows an illustrative example of playlist titles and playlist descriptions that can be included with training data in accordance with some embodiments of the disclosed subject matter.

DETAILED DESCRIPTION

In accordance with various embodiments, mechanisms (which can include methods, systems, and media) for determining playlist title coherence and quality are provided.

In some embodiments, the mechanisms described herein can determine that a user-generated playlist is suitable to recommend to other users in a streaming service based on a determined quality of the playlist title.

In some embodiments, the mechanisms can use a trained multi-language machine learning model. In some embodiments, the mechanisms can train the multi-language machine learning model on sequences of characters. In some embodiments the mechanisms can train the multi-language machine learning model on a dataset comprising playlist titles and playlist descriptions from professionally curated playlists. In some embodiments, the training dataset can include human-reviewed translations of the playlist titles and the playlist descriptions in multiple languages.

In some embodiments, the mechanisms can use the trained model to score the quality of user-generated playlists based on the negative log-likelihood that the sequence of characters in the user-generated playlist title would appear in a professionally curated playlist. For example, playlist information, such as playlist titles and playlist descriptions, can be received and a byte-level representation of the playlist information can be generated from the playlist information, where each input byte from the byte-level representation can be mapped into an embedding space and input into the trained model. In continuing this example, the trained model can output a perplexity score for each byte or sequence in the byte-level representation and a total perplexity score can be determined from a combination of the perplexity scores for each byte or sequence in the byte-level representation, where the total perplexity score can be used to represent a coherence or quality of the playlist information.

In some embodiments, the mechanisms can generate a recommendation for the user-generated playlist based on the determined quality of the user-generated playlist title. For example, the user-generated playlist can be included in a group of playlists that are available for selection by a recommendation system. In another example, the user-generated playlist can be included in a group of content that is available for presentation on a page associated with a content provider. In another example, the user-generated playlist having playlist information that is deemed to have a high total perplexity score, which can indicate an unlikely sequence of bytes and which can indicate that the playlist information is incoherent, can be removed or otherwise deemed ineligible for selection by a recommendation system.

These and other features for determining playlist title coherence and quality are described further in connection with FIGS. 1-5.

Figure 1:
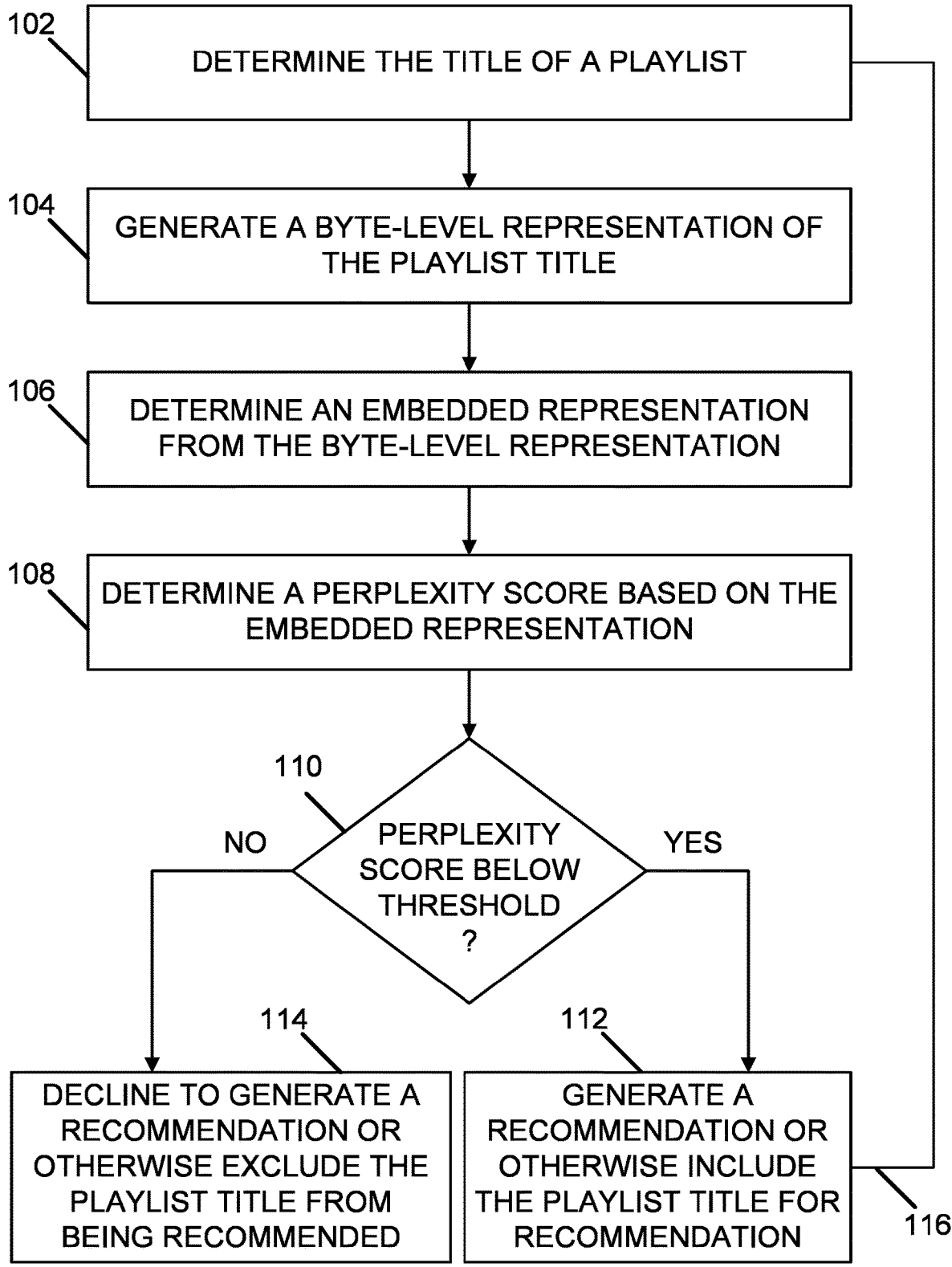
FIGS. 1 and 2 show illustrative examples of a process for determining playlist title coherence and quality in accordance with some embodiments of the disclosed subject matter.

Turning to FIG. 1, an example 100 of an illustrative process for determining playlist title coherence and quality in accordance with some embodiments is shown. In some embodiments, process 100 can be executed by any suitable hardware, such as server 402 or user devices 408 and 410, as discussed in connection with FIG. 4 below.

In some embodiments, process 100 can begin at block 102, where process 100 can determine playlist information associated with a playlist, such as the title of a playlist. For example, process 100 can identify a playlist that has been generated and/or saved by a user of a content streaming service and can retrieve playlist information associated with the identified playlist. In continuing this example, a content streaming service can allow users to generate and/or save playlists with user-generated playlist titles. In a more particular example, as shown at 202 in FIG. 2, the title of the user-generated playlist can be "hello."

It should be noted that process 100 can determine the playlist title for any suitable number of user-generated playlists. For example, process 100 can be repeated for any suitable number of user-generated playlists that are publicly available on the content streaming service. In another example, process 100 can be repeated for any suitable number of playlists that have been generated on the content streaming service within a particular period of time (e.g., the last week, the last 30 days, the last six months, etc.).

It should also be noted that, although process 100 generally describes the use of playlist titles from identified playlists, this is merely illustrative and any suitable playlist information can be used for determining playlist title coherence and quality. For example, process 100 can retrieve a playlist description from metadata associated with a playlist generated on a content streaming service. In another example, process 100 can retrieve any suitable container information for tracks, episodes, and/or any suitable media content, such as playlist titles, titles from content items that are contained within the playlist container, images associated with content items that are contained within the playlist container, etc.

Figure 2:
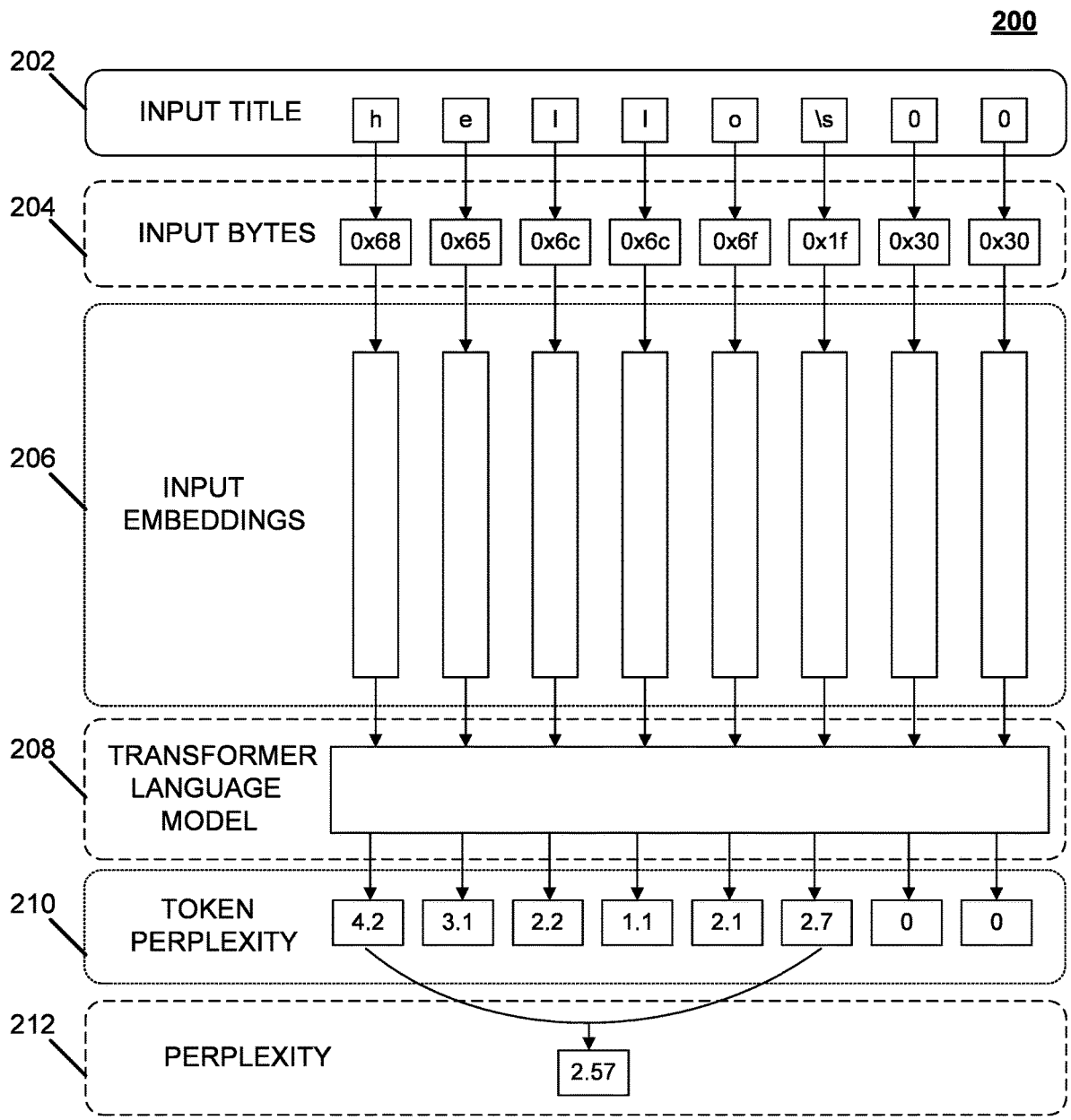

In some embodiments, process 100 can continue to block 104, where process 100 can generate a byte-level representation of the playlist title or any other playlist information. For example, as shown in FIG. 2, a playlist title of "hello" can be divided into individual characters (e.g., "h," "e," "l," "l," and "o") and the individual characters can be represented by a single byte. In continuing this example, as also shown in FIG. 2, the playlist title of "hello" can be represented by the hexadecimal string of [0x68 0x65 0x6c 0x6c 0x6f] based on the ASCII 8-bit character set for a playlist title determined to be "hello" at 102. In some embodiments, process 100 can use any suitable standard for character sets such as ASCII versions, ISO-8895-1, Unicode UTF versions -8, -16, and/or -32. In some embodiments, at 104, process 100 can determine a byte representation of characters in any suitable alphabet, character set, and/or writing system. For example, in some embodiments, process 100 can generate the string [0xe4 0xbd 0xa0 0xe5 0xa5 0xbd] based on a playlist title determined to be "你好" (Chinese characters commonly pronounced "Nǐ hǎo", translating to "hello" in English) at 102. It should be noted that, as shown in the string [0xe4 0xbd 0xa0 0xe5 0xa5 0xbd], each unicode character can be divided into several bytes.

It should be noted that, in some embodiments, a particular separator or end of sequence byte can be appended to the end of a byte-level representation to indicate the end of a byte-level representation. For example, as shown in FIG. 2, an ASCII unit separator control token (US) or any other suitable token can be appended to indicate the end of a byte level representation.

In some embodiments, process 100 can continue to block 106, where process 100 can determine an embedded representation (e.g., vector) from the byte-level representation of the playlist title. In some embodiments, process 100 can use any suitable mathematical operation to determine embedded representations from the byte-level representations. In some embodiments, process 100 can use any suitable natural language process at 106, such as a neural network, and can represent each byte as a vector in an embedding space having any suitable dimensionality (e.g., a 3-dimensional vector, a 256-dimensional vector, etc.). For example, in some embodiments, at 106, process 100 can generate an embedded representation that maps each input byte of the byte-level representation into an embedding space. In a more particular example, process 100 can apply each input byte to Word2Vec, GloVe, and/or any other suitable model to determine a separate vector for each byte.

In some embodiments, process 100 can continue to block 108, where process 100 can determine a perplexity score for each embedded representation determined at 106. In some embodiments, process 100 can use any suitable approach to determine the perplexity scores. For example, process 100 can use a trained neural network, machine learning model, and/or any other suitable calculation at block 108 to determine the perplexity scores. In a more particular example, process 100 can use any suitable deep learning language model to determine the perplexity scores. For example, in some embodiments, process 100 can use the embeddings determined at block 106 as inputs to a pre-trained deep learning language model and can receive perplexity scores for each embedding as output from the deep learning language model.

It should be noted that, in some embodiments, process 100 can train the deep learning language model with a dataset that includes playlist titles, playlist descriptions, and/or any other suitable playlist information from selected playlists (e.g., professionally curated playlists, an approved set of playlists, etc.). In some embodiments, the training dataset can include human-reviewed translations of the playlist titles and the playlist descriptions in multiple languages.

It should also be noted that the deep learning language model can be trained to determine the quality of user-generated playlists based on the negative log-likelihood that the sequence of characters in the user-generated playlist title would appear in one of the playlists from the training dataset (e.g., one of the professionally curated playlists). For example, playlist information, such as playlist titles and playlist descriptions, can be received and a byte-level representation of the playlist information can be generated from the playlist information, where each input byte from the byte-level representation can be mapped into an embedding space and input into the trained deep learning language model. In continuing this example, the trained deep learning language model can output a perplexity score for each byte or sequence in the byte-level representation.

In some embodiments, process 100 can then determine, at 108, an overall perplexity score for the playlist title based on perplexity scores for each embedded representation that was input into the trained deep learning language model. For example, in some embodiments, process 100 can calculate an average perplexity score output from the deep learning language model over the number of bytes in the byte-level representation and can set the average perplexity score as the overall perplexity score of the playlist title.

It should be noted that a low perplexity score determined from the deep learning language model at 108 can indicate that the playlist title includes a likely sequence of bytes based on the training dataset of playlist information or otherwise indicate that the playlist title includes coherent text based on the training dataset of playlist information. Alternatively, it should also be noted that a high perplexity score determined from the deep learning language model at 108 can indicate that the playlist title includes an unlikely sequence of bytes based on the training dataset of playlist information or otherwise indicate that the playlist title includes incoherent text based on the training dataset of playlist information.

It should further be noted that per-token outputs from the trained deep learning language model can be averaged to calculate the overall perplexity score of the playlist title over non-padding values or non-zero input values. For example, as shown in FIG. 2, perplexity scores for the input bytes "h," "e," "l," "l," "o," and the end of sequence byte "/s" at 210 can be averaged to generate an overall total perplexity score of 2.57 as shown in 212.

In some embodiments, process 100 can continue to block 110, where process 100 can determine if the overall perplexity score of the playlist title is below a threshold value. In some embodiments, any suitable threshold can be used at 110. In some embodiments, process 100 can determine that "high quality" playlist titles are below a perplexity threshold by comparing the playlist title perplexity score to a threshold. For example, a playlist title that is considered "high quality" can have a lower perplexity score than a different playlist title that is considered "low quality" or "gibberish". Continuing this example, in some embodiments, a playlist title of "Party Rock Hits" (that is, a high quality playlist title) can have a perplexity score of 2.2, while a playlist title of "Drawn Painful Happiness" (that is, a low quality playlist title) can have a perplexity score of 8.1.

In some embodiments, process 100 can determine any additional metrics at 110 for the playlist title using the perplexity score. For example, in some embodiments, process 100 can determine a recall score by calculating the number of playlist titles that were classified as being positive by the deep learning language model and classified as being positive by a human reviewer over the total number of playlist titles that were classified as being positive by the deep learning model and either classified as being positive or negative by the human reviewer. In another example, in some embodiments, process 100 can determine the precision by calculating the number of playlist titles that were classified as being positive by the deep learning language model and classified as being positive by a human reviewer over the total number of playlist titles that were classified as being positive by a human reviewer and either classified as being positive or negative by the deep learning language model. In some embodiments, recall and precision can be determined using any additional information, such as quality scores for a playlist title from external sources (e.g., review scores from human raters).

In some embodiments, process 100 can continue to block 112 (e.g., "YES" at block 110 determining that the overall perplexity score of the playlist title is below a threshold value), where process 100 can generate an indication for a streaming service to include the playlist corresponding to the playlist title. In some embodiments, any suitable message and/or indication can be sent to the streaming service which indicates the playlist title is suitable for recommendation.

In some embodiments, process 100 can decline to generate an indication or otherwise exclude the playlist title from being recommended by a recommendation system of the streaming service. For example, in some embodiments, process 100 can determine at 110 that the title perplexity score is above the threshold (e.g., "NO" at block 110 determining that the overall perplexity score of the playlist title is above a threshold value). Continuing this example, process 100 can decline to generate a recommendation for the playlist corresponding to the "low quality" playlist title or otherwise exclude the "low quality" playlist title from being recommended by a recommendation system of the streaming service at 114. In another example, in some embodiments, process 100 can train the language model on pre-approved playlist titles and can decline to generate a recommendation, as discussed below in connection with FIG. 2.

In some embodiments, process 100 can continue to block 116, where process 100 can repeat at 102 with a new playlist title in response to generating a recommendation for the playlist corresponding to the "high quality" playlist title or otherwise including the "high quality" playlist title in recommendations by a recommendation system of the stream service. In some embodiments, process 100 can repeat at any suitable frequency and for any suitable number of repetitions. For example, process 100 can be in continuous operation while the streaming platform is accepting and/or recommending user-generated playlists.

Turning to FIG. 2, an illustrative example 200 of a process to train a deep learning language model over playlist titles, playlist descriptions, and/or any other suitable playlist information in accordance with some embodiments is shown. In some embodiments, blocks of model 200 can correspond to blocks of process 100 as described above in connection with FIG. 1. In some embodiments, process 200 can be executed with any suitable training data, such as playlist titles 310, 320, and 330 and playlist descriptions 315, 325, and 335 as discussed in connection with FIG. 3 below. In some embodiments, process 200 can be executed by any suitable hardware, such as server 402 or user devices 408 and 410, as discussed in connection with FIG. 4 below.

In some embodiments, process 200 can begin at block 202 by identifying the character sequence in a playlist title and/or playlist description from a training dataset. For example, in some embodiments, as shown in FIG. 2, process 200 can identify a playlist title of "hello" and can move to block 204 by generating a byte sequence, as described at 104 of process 100 in connection with FIG. 1 above.

In some embodiments, process 200 can determine an embedded representation for each byte in the byte sequence from 204. In some embodiments, process 200 can use any suitable mathematical operation to determine the embedded representation for each byte in a byte-level representation within an embedding space. In some embodiments, process 200 can use any suitable natural language process at 206, such as a neural network, and can represent each byte as a vector having any suitable dimensionality (e.g., a 3-dimensional vector, a 200-dimensional vector). For example, in some embodiments, at 206, process 200 can use Word2Vec, GloVe, and/or any other suitable model to determine a vector in an embedding space for each of the bytes in the byte sequence at 204.

In some embodiments, process 200 can continue to block 208, where process 200 can use the embeddings from 206 as inputs to any suitable natural language processing model and/or neural network. In some embodiments, the language model can have a self-attention mechanism and a feed-forward network as part of an encoder embedding module in the language model. In addition, in some embodiments, the encoder embedding module can include any other suitable mechanisms such as an "add and normalize" mechanism. In some embodiments, the language model can have a self-attention mechanism and a feed-forward network as part of a decoder module in the language model. In addition, in some embodiments, the decoder module can include any other suitable mechanisms such as an "add and normalize" mechanism.

In some embodiments, the encoding and decoding modules can iterate any suitable number of times. For example, in some embodiments, the encoding and decoding modules can iterate once for each byte in the sequence of bytes from 206. In some embodiments, the encoding and decoding modules can each use a positional encoder to indicate the position of each byte within the byte sequence.

In some embodiments, process 200 can continue to block 210, where the deep learning language model can output a probability and/or a perplexity score for each byte in the byte sequence. In some embodiments, at block 210, the language model can output a total perplexity score for the byte sequence as a whole. In some embodiments, at 210, the language model can output a perplexity score for each byte in the byte sequence and process 200 can average over the byte-level perplexity scores to arrive at a total perplexity score at block 212.

In some embodiments, process 200 can iterate any suitable length of time. For example, process 200 can iterate through all data entries in the training data in some embodiments. In some embodiments, process 200 can result in a trained language model once all the training data has been processed.

It should be understood that at least some of the above-described blocks of process 100 of FIG. 1 and/or process 200 of FIG. 2 can be executed or performed in any order or sequence not limited to the order and sequence shown in and described in connection with the figure. Also, some of the above blocks of process 100 of FIG. 1 and/or process 200 of FIG. 2 can be executed or performed substantially simultaneously where appropriate or in parallel to reduce latency and processing times. Additionally or alternatively, some of the above described blocks of process 100 of FIG. 1 and/or process 200 of FIG. 2 can be omitted.

Turning to FIG. 3, an illustrative example 300 of training data including playlist titles and playlist descriptions that can be used to train a language model in accordance with some embodiments is shown. As illustrated, training data 300 can include playlist titles 310, 320, and 330 and playlist descriptions 315, 325, and 335. In some embodiments, training data 300 can be used to train a Transformer language model, as discussed in process 200 in connection with FIG. 2 above.

In some embodiments, playlist titles 310, 320, and 330 and playlist descriptions 315, 325, and 335 can be any suitable word, phrase, and/or sequence of characters. In some embodiments, playlist titles 310, 320, and 330 and playlist descriptions 315, 325, and 335 can be written in any suitable language.

In some embodiments, training data 300 can include playlist titles translated into one or more languages. For example, in some embodiments, playlist title 310 can be "Cool Britannia: '90 s Britpop," a phrase written in English. In another example, in some embodiments, playlist title 320 can be "酷不列颠尼亚：90 年代英伦摇滚", a Chinese translation of the English phrase in title 310. In some embodiments, translations from one language to another can be performed by a human translator or a machine translator.

In some embodiments, training data 300 can include playlist titles and playlist descriptions from any suitable source. For example, in some embodiments, training data 300 can be compiled from a streaming service. In another example, in some embodiments, training data 300 can be gathered from musicians, sound engineers and sound mixers, DJs, song writers, musicologists and/or any other persons working in the music industry. Note that although three playlist titles and three playlist descriptions are shown in FIG. 3, training data 300 can include any suitable number of playlist titles and playlist descriptions in some embodiments.

Figure 4:
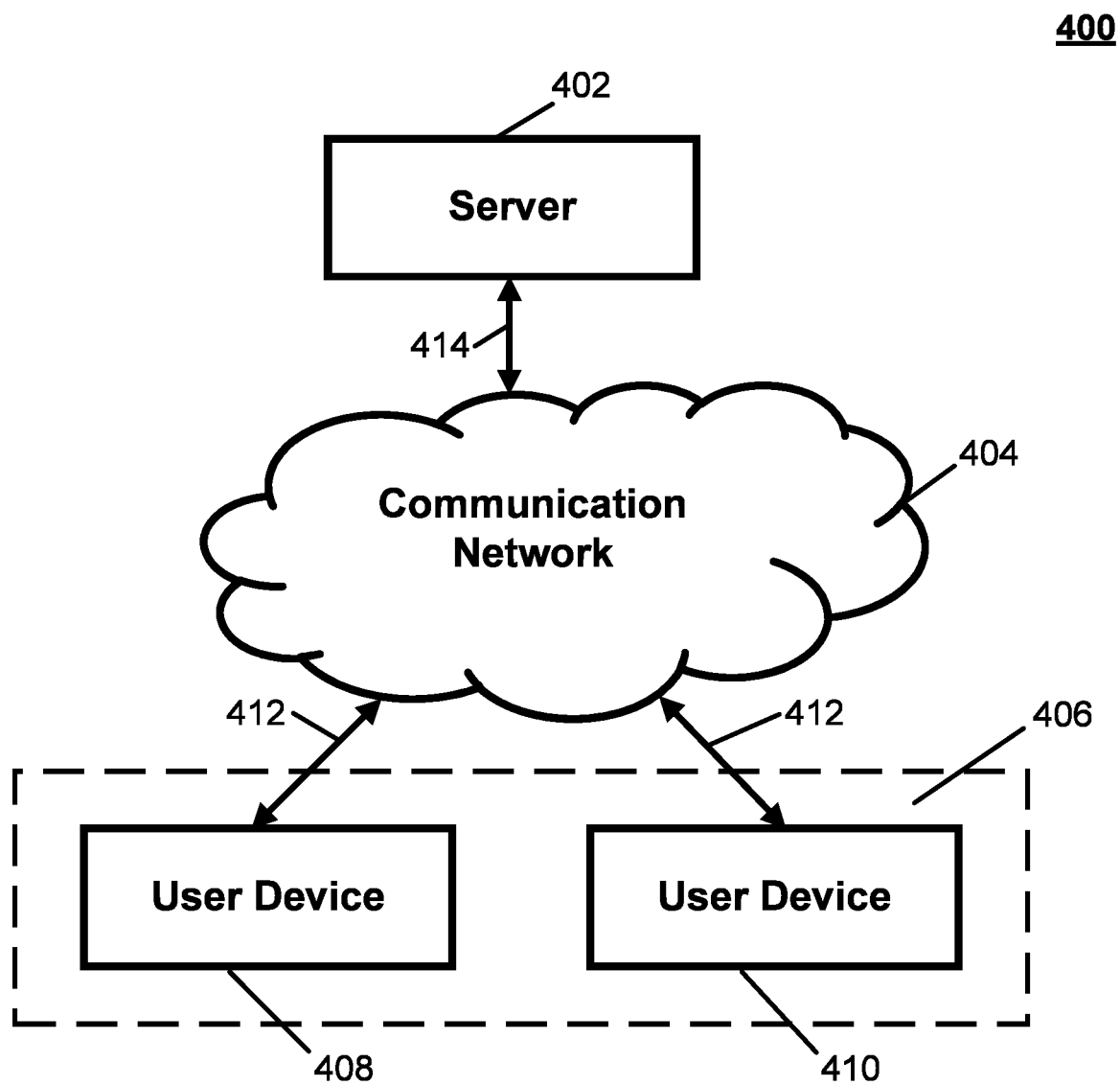
FIG. 4 shows a schematic diagram of an illustrative system suitable for implementation of mechanisms described herein for generating playlist recommendations in accordance with some embodiments of the disclosed subject matter.
Figure 5:
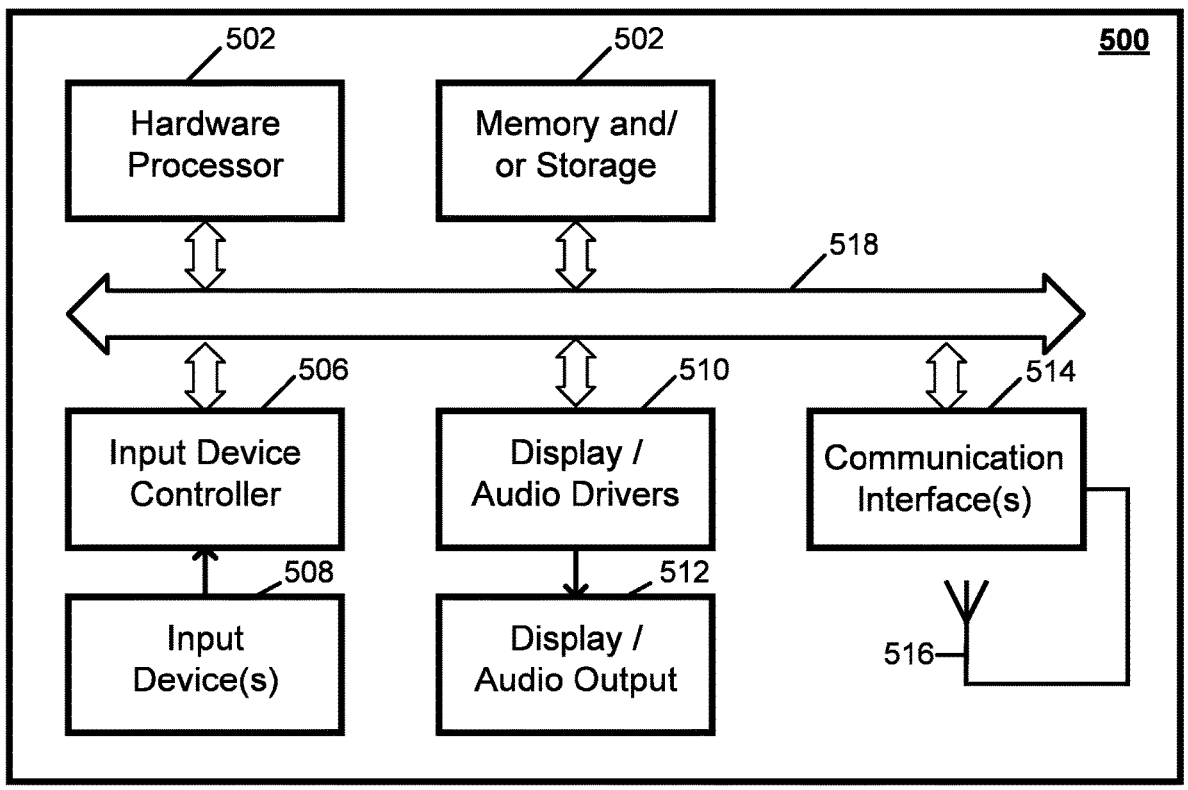
FIG. 5 shows a detailed example of hardware that can be used in a server and/or a user device of FIG. 4 in accordance with some embodiments of the disclosed subject matter.

Turning to FIG. 4, an illustrative example 400 of hardware for generating playlist recommendations that can be used in accordance with some embodiments of the disclosed subject matter is shown. As illustrated, hardware 400 can include a server 402, a communication network 404, and/or one or more user devices 406, such as user devices 408 and 410.

Server 402 can be any suitable server(s) for storing information, data, programs, media content, and/or any other suitable content. In some embodiments, server 402 can perform any suitable function(s). For example, in some embodiments, server 402 can train a Transformer language model on a set of playlist title training data as discussed above in FIG. 2. In another example, in some embodiments, server 402 can detect a user-generated playlist title and generate a perplexity score and/or generate a recommendation to a streaming service as discussed above in FIG. 1.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for generating a playlist recommendation. In some embodiments, user device 406 can include any suitable type of user device, such as mobile phones, tablet computers, wearable computers, laptop computers, desktop computers, smart televisions, media players, game consoles, vehicle information and/or entertainment systems, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Server 402 and user devices 406 can be implemented using any suitable hardware in some embodiments. For example, in some embodiments, devices 402 and 406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 402. In some embodiments, hardware processor 502 can be controlled by a computer program stored in memory and/or storage 504 of user device 406.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method comprising:
   detecting, using a hardware processor, a user-generated title associated with a playlist available on a streaming service;
   generating, using the hardware processor, a byte-level representation of the user-generated title based on a sequence of bytes corresponding to the user-generated title of the playlist;
   determining, using the hardware processor, an embedded representation of the user-generated title based on the byte-level representation;
   determining, using the hardware processor, a plurality of perplexity scores that each correspond to an individual perplexity score of a portion of the embedded representation of the user-generated title by inputting the embedded representation of the user-generated title into a trained language model, wherein the plurality of perplexity scores is an output of the trained language model;
   determining, using the hardware processor, an overall perplexity score of the user-generated title based on the plurality of perplexity scores, a number of bytes in the byte-level representation, and a position of each byte in the byte-level representation, wherein the overall perplexity score indicates whether the sequence of bytes corresponding to the user-generated title of the playlist is an unlikely sequence of bytes or a likely sequence of bytes; and
   responsive to determining that the overall perplexity score indicates that the sequence of bytes corresponding to the user-generated title of the playlist is a likely sequence of bytes, causing, using the hardware processor, a recommendation system associated with the streaming service to recommend the playlist based on the overall perplexity score of the user-generated title.

2. The method of claim 1, wherein the trained language model is trained using a plurality of training data that includes at least one of a plurality of pre-approved professionally curated playlist titles and a plurality of pre-approved professionally curated playlist descriptions.

3. The method of claim 1, wherein the trained language model is trained using a plurality of training data that includes a plurality of pre-approved professionally curated playlist titles, and wherein the trained language model is configured to generate the plurality of perplexity scores of the user-generated title of the playlist based on a negative log-likelihood that the sequence of bytes corresponding to the user-generated title of the playlist would appear in one of the plurality of pre-approved professionally curated playlist titles in the plurality of training data.

4. The method of claim 1, further comprising:
   responsive to determining that the overall perplexity score indicates that the sequence of bytes corresponding to the user-generated title is an unlikely sequence of bytes, causing, using the hardware processor, the recommendation system associated with the streaming service to exclude the playlist from being recommended.

5. The method of claim 1, further comprising determining that the user-generated title is based in a particular language from a plurality of languages.

6. The method of claim 1, wherein the playlist comprises a plurality of music tracks.

7. A system for generating playlist recommendations, the system comprising:
   a hardware processor that is configured to:
      detect a user-generated title associated with a playlist available on a streaming service;
      generate a byte-level representation of the user-generated title based on a sequence of bytes corresponding to the user-generated title of the playlist;
      determine an embedded representation of the user-generated title based on the byte-level representation;
      determine a plurality of perplexity scores that each correspond to an individual perplexity score of a portion of the embedded representation of the user-generated title by inputting the embedded representation of the user-generated title into a trained language model, wherein the plurality of perplexity scores is an output of the trained language model;
      determine an overall perplexity score of the user-generated title based on the plurality of perplexity scores, a number of bytes in the byte-level representation, and a position of each byte in the byte-level representation, wherein the overall perplexity score indicates whether the sequence of bytes corresponding to the user-generated title of the playlist is an unlikely sequence of bytes or a likely sequence of bytes; and
      responsive to determining that the overall perplexity score indicates that the sequence of bytes corresponding to the user-generated title of the playlist is a likely sequence of bytes, cause a recommendation system associated with the streaming service to recommend the playlist based on the overall perplexity score of the user-generated title.

8. The system of claim 7, wherein the trained language model is trained using a plurality of training data that includes at least one of a plurality of pre-approved professionally curated playlist titles and a plurality of pre-approved professionally curated playlist descriptions.

9. The system of claim 7, wherein the trained language model is trained using a plurality of training data that includes a plurality of pre-approved professionally curated playlist titles and wherein the trained language model is configured to generate the plurality of perplexity scores of the user-generated title of the playlist based on a negative log-likelihood that the sequence of bytes corresponding to the user-generated title of the playlist would appear in one of the plurality of pre-approved professionally curated playlist titles in the plurality of training data.

10. The system of claim 9, wherein the hardware processor is further configured to:
    responsive to determining that the overall perplexity score indicates that the sequence of bytes corresponding to the user-generated title is an unlikely sequence of bytes, cause the recommendation system associated with the streaming service to exclude the playlist from being recommended.

11. The system of claim 7, wherein the hardware processor is further configured to determine that the user-generated title is based in a particular language from a plurality of languages.

12. The system of claim 7, wherein the playlist comprises a plurality of music tracks.

13. A non-transitory computer-readable medium containing computer executable instructions that, when executed by a processor, cause the processor to:
  detect a user-generated title associated with a playlist available on a streaming service;
  generate a byte-level representation of the user-generated title based on the user-generated title of the playlist;
  determine an embedded representation of the user-generated title based on the byte-level representation;
  determine a plurality of perplexity scores that each correspond to an individual perplexity score of a portion of the embedded representation by inputting the embedded representation of the user-generated title into a trained language model, wherein the plurality of perplexity scores is an output of the trained language model;
  determine an overall perplexity score of the user-generated title based on the plurality of perplexity scores, a number of bytes in the byte-level representation, and a position of each byte in the byte-level representation, wherein the overall perplexity score indicates whether a sequence of bytes corresponding to the user-generated title of the playlist is an unlikely sequence of bytes or a likely sequence of bytes; and
  responsive to determining that the overall perplexity score indicates that the sequence of bytes corresponding to the user-generated title of the playlist is a likely sequence of bytes. cause a recommendation system associated with the streaming service to recommend the playlist based on the overall perplexity score of the user-generated title.

14. The non-transitory computer-readable medium of claim 13, wherein the trained language model is trained using a plurality of training data that includes at least one of a plurality of pre-approved professionally curated playlist titles and a plurality of pre-approved professionally curated playlist descriptions.

15. The non-transitory computer-readable medium of claim 13, wherein the trained language model is trained using a plurality of training data that includes a plurality of pre-approved professionally curated playlist titles and wherein the trained language model is configured to generate the plurality of perplexity scores of the user-generated title of the playlist based on a negative log-likelihood that the sequence of bytes corresponding to the user-generated title of the playlist would appear in one of the plurality of pre-approved professionally curated playlist titles in the plurality of training data.

16. The non-transitory computer-readable medium of claim 13, wherein the execution of the instructions further causes the processor to:
  responsive to determining that the overall perplexity score indicates that the sequence of bytes corresponding to the user-generated title is an unlikely sequence of bytes, cause the recommendation system associated with the streaming service to exclude the playlist from being recommended.

17. The non-transitory computer-readable medium of claim 13, wherein execution of the instructions further causes the processor to determine that the user-generated title is based in a particular language from a plurality of languages.

18. The non-transitory computer-readable medium of claim 13, wherein the playlist comprises a plurality of music tracks.

* * * * *